(12) United States Patent
Lin

(10) Patent No.: US 7,145,444 B2
(45) Date of Patent: Dec. 5, 2006

(54) CIRCUIT FOR CONTROLLING VOLTAGE IN A TIRE-BASED UNIT OF TIRE PARAMETER SENSING SYSTEM AND ASSOCIATED METHOD

(75) Inventor: Xing Ping Lin, Orchard Lake, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 242 days.

(21) Appl. No.: 10/729,514

(22) Filed: Dec. 5, 2003

(65) Prior Publication Data

US 2005/0122214 A1   Jun. 9, 2005

(51) Int. Cl.
*B60C 23/00*   (2006.01)

(52) U.S. Cl. ............... 340/442; 340/447; 340/636.1

(58) Field of Classification Search .............. None
See application file for complete search history.

(56) References Cited

U.S. PATENT DOCUMENTS 6,630,815 B1 * 10/2003 Hanafusa et al. ........... 320/150
2002/0075397 A1   6/2002 Hanada et al.

* cited by examiner

*Primary Examiner*—Julie Bichngoc Lieu
(74) *Attorney, Agent, or Firm*—Tarolli, Sundheim, Covell & Tummino LLP

(57) ABSTRACT

A circuit (14) for use in a tire (16) of a vehicle (10) having a tire parameter sensing system (12) includes a battery (60) for supplying electrical energy. The battery (60) has an equivalent series resistance (64) that varies inversely with temperature. The circuit (14) further includes a current control device (90) that is responsive to at least one of an output voltage of the battery and temperature for adjusting a current draw from the battery (60) to insure a predetermined minimum output voltage from the battery (60).

15 Claims, 3 Drawing Sheets

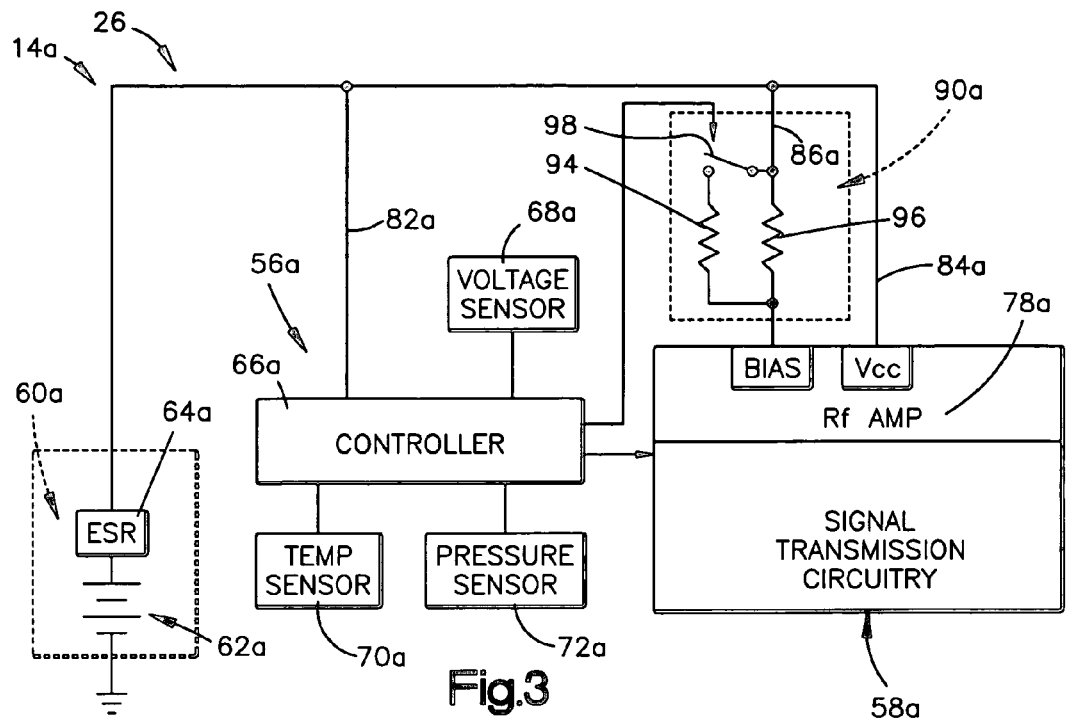
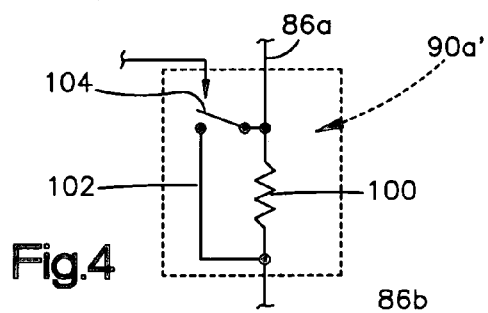
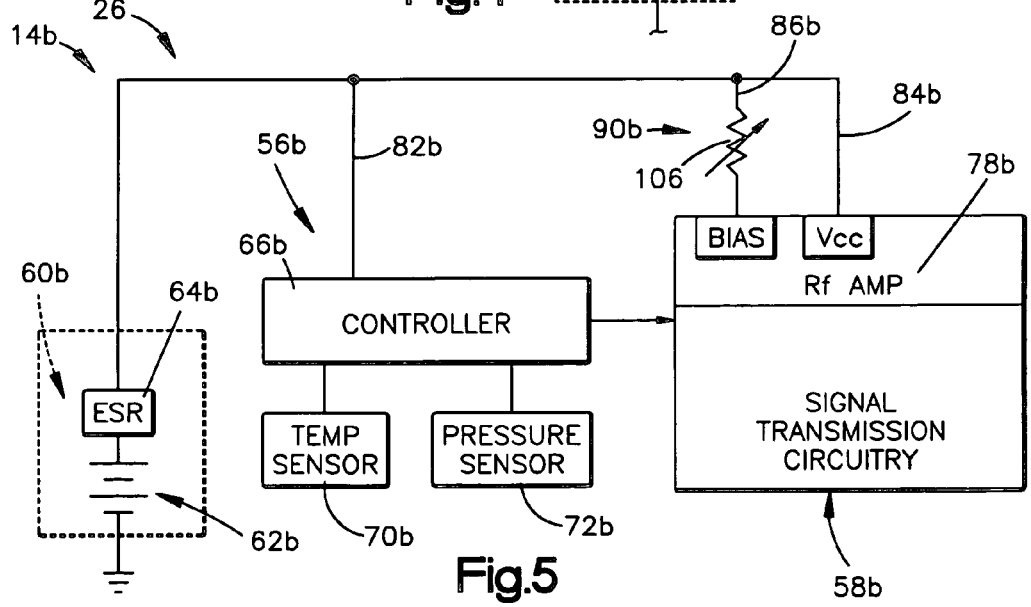

CIRCUIT FOR CONTROLLING VOLTAGE IN A TIRE-BASED UNIT OF TIRE PARAMETER SENSING SYSTEM AND ASSOCIATED METHOD

TECHNICAL FIELD

The present invention relates to a tire parameter sensing system for a vehicle. More particularly, the present invention relates to a circuit for controlling voltage in a tire-based unit of a tire parameter sensing system and an associated method.

BACKGROUND OF THE INVENTION

A typical tire parameter sensing system for a vehicle includes a vehicle-based unit and a plurality of tire-based units. Each vehicle tire has an associated tire-based unit. Each tire-based unit includes at least one parameter sensor (e.g., pressure, temperature, etc.) and transmission circuitry for transmitting a tire parameter signal indicative of the sensed parameter(s). The vehicle-based unit includes a receiver for receiving tire parameter signals from the tire-based units and a display for providing information to the vehicle operator regarding the sensed tire parameter.

Typically, each tire-based unit includes a long life battery for providing electrical energy to the parameter sensor and transmission circuitry. The batteries typically exhibit an internal resistance, known as an equivalent series resistance. The equivalent series resistance of the batteries varies inversely with temperature.

Vehicles having tire parameter sensing systems are subject to varying conditions. Many vehicles are subjected to extremely cold temperatures during winter months. When the tire-based units are in a low temperature environment, the equivalent series resistance of the batteries can increase to a level that is sufficient to deprive the electronic circuitry of the tire-based unit of a proper operating voltage. For example, the parameter sensor of the tire-based unit may include a microcomputer that operates when supplied with at least two volts of electrical energy. The normal output voltage of the battery is 2.9 to 3.2 volts DC at a nominal operating temperature. When the equivalent series resistance of the battery increases to a particular level as a result of cold temperature, the voltage drop resulting from the equivalent series resistance of the battery may result in the microcomputer receiving less than two volts of electrical energy. As a result, the tire-based unit may become inoperative. It is desirable to control the voltage of the tire-based unit so that decreases in temperature do not result in the tire-based unit becoming inoperative.

SUMMARY OF THE INVENTION

The present invention relates to a circuit for controlling voltage in a tire-based unit of a tire parameter sensing system. The circuit comprises a battery for supplying electrical energy. The battery has an equivalent series resistance that varies inversely with temperature. The circuit also comprises a current control device that is responsive to at least one of an output voltage of the battery and temperature for adjusting a current draw from the battery to insure a predetermined minimum output voltage from the battery.

According to another aspect, the present invention relates to a circuit for use in a tire of a vehicle having a tire parameter sensing system. The circuit comprises a battery for supplying electrical energy. The battery has an equivalent series resistance that varies inversely with temperature. The circuit further comprises a sensor portion that is operative to sense a parameter of the tire when supplied with a voltage of at least a predetermined minimum value. A resistance varying device of the circuit is responsive to at least one of a supplied voltage and a temperature for reducing a current draw from the battery so as to reduce a voltage drop resulting from the equivalent series resistance of the battery and maintain at least the predetermined minimum value of voltage to the sensor portion.

According to yet another aspect, the present invention relates to a method of controlling voltage in a tire-based unit of a tire parameter sensing system having a battery. The method comprises the steps of: determining whether an equivalent series resistance of the battery is increasing; and reducing a current draw from the battery, in response to determining that the equivalent series resistance is increasing, so as to reduce a voltage drop resulting from the equivalent series resistance of the battery and maintain an output voltage from the battery of at least a predetermined minimum value.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 3 schematically illustrates an exemplary circuit constructed in accordance with a second embodiment of the present invention;

FIG. 4 schematically illustrates an alternative construction of a portion of the circuit of FIG. 3;

FIG. 5 schematically illustrates an exemplary circuit constructed in accordance with a third embodiment of the present invention.

DETAILED DESCRIPTION OF THE INVENTION

Figure 1:
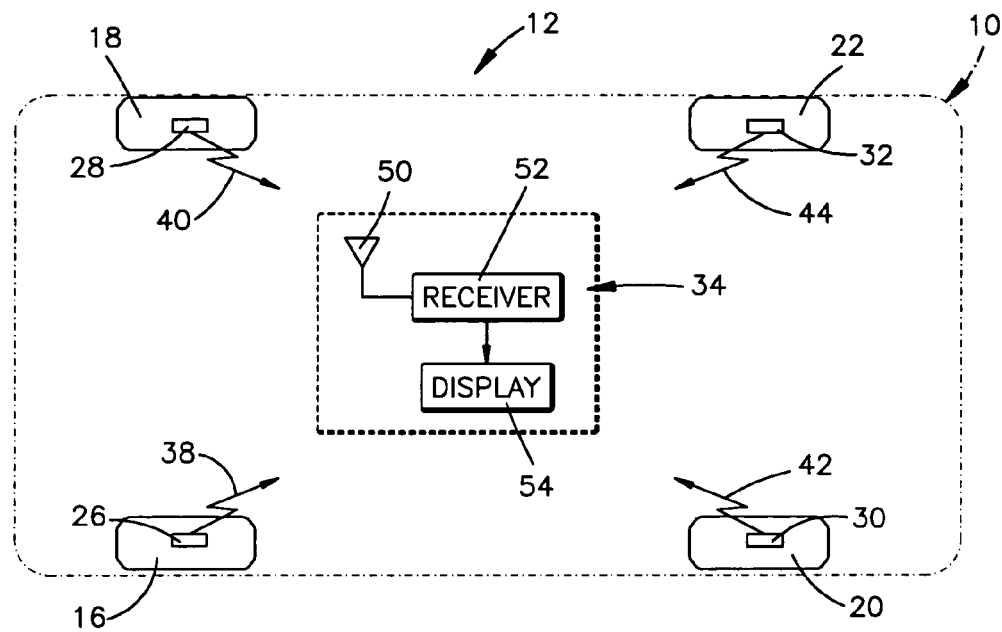
FIG. 1 schematically illustrates a vehicle including a tire parameter sensing system having a circuit constructed in accordance with the present invention.

FIG. 1 schematically illustrates a vehicle 10 including a tire parameter sensing system 12. The tire parameter sensing system 12 includes a circuit 14 (FIG. 2) constructed in accordance with the present invention. For illustrative purposes, the vehicle 10 of FIG. 1 is an automobile having four tires 16, 18, 20, and 22. Vehicles having a number of tires other than four are also contemplated by the present invention.

The tire parameter sensing system 12 includes four tire-based units 26, 28, 30, and 32 and a vehicle-based unit 34. Each tire 16, 18, 20, and 22 of the vehicle 10 includes an associated tire-based unit 26, 28, 30, and 32, respectively, for sensing at least one parameter of the tire (e.g., pressure, temperature, etc.) and for providing a tire parameter signal 38, 40, 42, and 44, respectively, to the vehicle-based unit 34. The tire parameter signals 38, 40, 42, and 44 are indicative of the sensed parameter(s) of the respective tires 16, 18, 20, and 22. Preferably, the tire parameter signals 38, 40, 42, and 44 are radio frequency (RF) signals.

The vehicle-based unit 34 includes an antenna 50 that is connected to a receiver 52. The receiver 52 includes components (not shown) for processing each received tire parameter signal, for determining whether the received tire parameter signal originated from an associated tire-based unit 26, 28, 30, or 32, and for outputting a signal indicative of the tire parameter to a display 54. The display is located within the vehicle occupant compartment and indicates the tire parameter to the vehicle operator.

Figure 2:
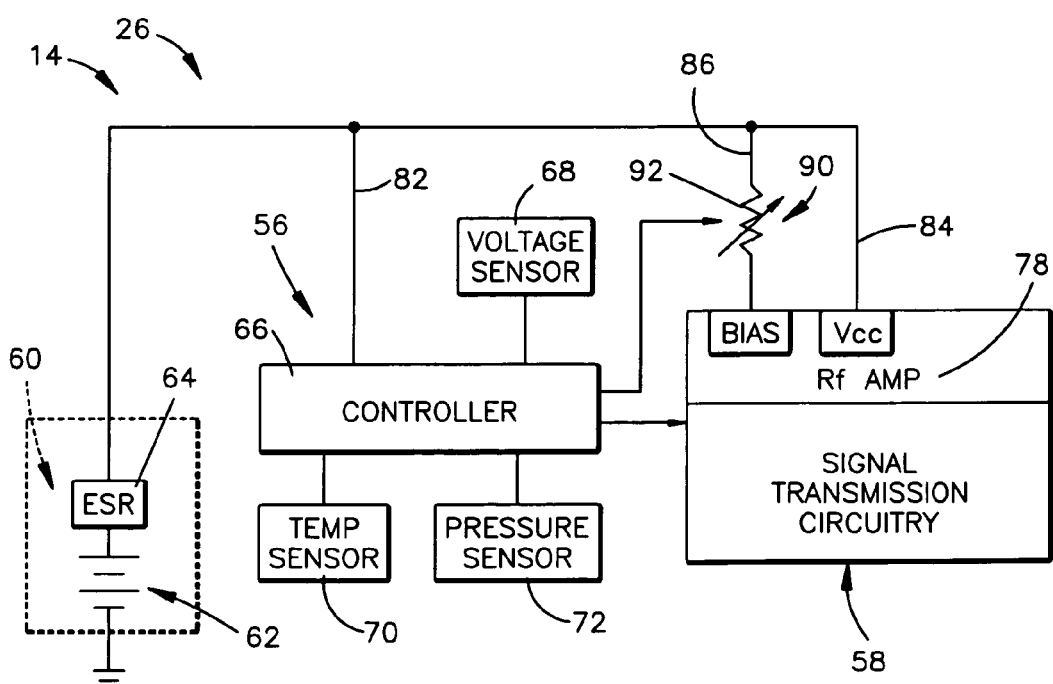
FIG. 2 schematically illustrates an exemplary circuit constructed in accordance with the present invention.

FIG. 2 schematically illustrates the circuit 14 for the tire-based unit 26 of the tire parameter sensing system 12 of FIG. 1. Tire-based units 28, 30, and 32 may include similar circuits. The circuit 14 includes a parameter sensing portion 56, signal transmission circuitry 58, and a battery 60 that includes a power supply portion 62 and an internal resistance 64. The parameter sensing portion 56 and the transmission circuitry 58 are wired in parallel to one another and in series with the battery 60. Thus, the battery 60 supplies electrical energy to both the parameter sensing portion 56 and the transmission circuitry 58 of the circuit 14.

The power supply portion 62 of the battery 60 is operative to supply electrical energy having a predetermined voltage value. For example, it is typical for the power supply portion 62 of the battery 60 in a tire-based unit, e.g. tire-based unit 26, of a tire parameter sensing system 12 to supply electrical energy having a voltage of 2.9 to 3.2 volts. The internal resistance 64 of the battery 60 is commonly referred to as the "equivalent series resistance" of the battery. The equivalent series resistance 64 of the battery varies inversely with temperature. Thus, as temperature decreases, the equivalent series resistance 64 of the battery 60 increases. A voltage drop is associated with the equivalent series resistance 64.

The parameter sensing portion 56 of the circuit 14 includes a controller 66, a voltage sensor 68, a temperature sensor 70, and a pressure sensor 72. The controller 66 is preferably a microcomputer. Alternatively, the controller 66 may be formed from discrete circuitry, an application-specific-integrated-circuit ("ASIC"), or any other type of control circuitry. The controller 66 performs a tire parameter sensing algorithm when supplied with a voltage of at least a predetermined minimum value. Any known tire parameter sensing algorithm may be used with the present invention. The controller 66 may be fully operational when supplied with a voltage of approximately 2.0 volts or more. When the controller 66 is supplied with a voltage that is less than the predetermined minimum value, e.g., less than the 2.0 volts, the controller 66 may become inoperative.

The voltage sensor 68 of the parameter sensing portion 56 of the circuit 14 is operatively coupled to the controller 66. The voltage sensor 68 senses the voltage of the electrical energy supplied to the parameter sensing portion 56 of the circuit 14 and provides the controller 66 with voltage signals indicative of the sensed supply voltage. Since the parameter sensing portion 56 of the circuit 14 is wired in series with the battery 60 and no components of the circuit 14 are located between the battery 60 and the parameter sensing portion 56, the voltage supplied to the parameter sensing portion 56 is essentially the same as an output voltage of the battery 60.

The temperature sensor 70 of the parameter sensing portion 56 of the circuit 14 is also operatively coupled to the controller 66. The temperature sensor 70 senses the temperature within the tire 16 that includes the tire-based unit 26 and provides the controller 66 with temperature signals indicative of the sensed temperature.

The pressure sensor 72 of the parameter sensing portion 56 of the circuit 14 is operatively coupled to the controller 66. The pressure sensor 72 senses the pressure within the tire 16 that includes the tire-based unit 26 and provides the controller 66 with pressure signals indicative of the sensed pressure.

The controller 66 is responsive to the temperature signals from the temperature sensor 70 and the pressure signals from the pressure sensor 72 for providing message packets that include the sensed temperature and pressure to the signal transmission circuitry 58. The signal transmission circuitry 58 includes components, such as a radio frequency (RF) amplifier 78, an antenna (not shown), and other known components, for transmitting a tire parameter signal, e.g., signal 38, to the vehicle-based unit 34. The signal transmission circuitry 58 receives the message packets from the controller 66 and transmits the message packets in the tire parameter signal, e.g., signal 38.

The battery 60 provides electrical energy to the parameter sensing portion 56 of the circuit 14 via an electrical path 82. The battery 60 provides electrical energy to the signal transmission circuitry 58 of the circuit 14 via electrical paths 84 and 86. Electrical path 84 provides electrical energy from the battery 60 for control voltage for the RF amplifier 78 of signal transmission circuitry 58. Electrical path 86 provides electrical energy from the battery to bias the RF amplifier 78 of the signal transmission circuitry 58.

The equivalent series resistance 64 of the battery 60 varies inversely with temperature. When the battery 60 is located in a cold environment, the voltage drop resulting from an increased equivalent series resistance 64 may become sufficiently high so as to reduce the output voltage of the battery below a predetermined minimum value needed to insure operation of the controller 66. As a result, the voltage supplied to the parameter sensing portion 56 of the circuit, which is essentially the same as the output voltage of the battery 60, will be below the predetermined minimum value and the controller 66 may become inoperative.

To prevent the voltage supplied to the parameter sensing portion 56 of the circuit 14 from falling below the predetermined minimum value when the equivalent series resistance 64 of the battery 60 increases, the circuit 14 is provided with a resistance varying device 90. The resistance varying device 90 of FIG. 2 is a variable resistor 92. The variable resistor 92 is located in the electrical path 86 for biasing the RF amplifier 78. The variable resistor 92 is controllably coupled to the controller 66 and the controller 66 controls the resistance of the variable resistor 92 so as to reduce the current drain on the battery 60 and maintain an output supply voltage greater than the predetermined minimum value to the parameter sensing portion 56 of the circuit 14.

The controller 66 is responsive to at least one of the voltage signals provided by the voltage sensor 68 and the temperature signals provided by the temperature sensor 70 for controlling the variable resistor 92. In an exemplary embodiment, the controller 66 is responsive to both the sensed voltage and the sensed temperature. The controller 66 uses the sensed voltage and sensed temperature to determine whether the equivalent series resistance 64 of the battery 60 is increasing. When the controller 66 determines that the equivalent series resistance 64 is increasing to a level in which the supply voltage to the parameter sensing 56 is nearing the predetermined minimum value, the controller 66 increases the resistance of the variable resistor 92. By increasing the resistance of the variable resistor 92, the RF amplifier 78 bias current drawn from the power supply portion 62 of the battery 60 is decreased. As a result, the voltage drop associated with the equivalent series resistance 64 of the battery decreases and the voltage supplied to the parameter sensing portion 56 of the circuit 14 increases (or is maintained even) as the equivalent series resistance 64 increases.

When the resistance of the variable resistor 92 is increased, the overall resistance of the circuit 14 increases. Since the voltage of the power supply portion 62 of the battery 60 remains relatively constant during changes in temperature, the total current of the circuit 14 is reduced as a result of the increased resistance of the variable resistor 92. The reduction in total current draw results in a reduced voltage drop associated with the equivalent series resistance 64. As a result, the increased resistance of the variable resistor 92 helps to maintain a supply voltage of at least the predetermined minimum value to the parameter sensing portion 56 of the circuit.

Generally, the gain of the RF amplifier 78 is directly associated with the bias current supplied to the RF amplifier. The decreased bias current resulting from increasing the resistance of the variable resistor 92 reduces the gain of the RF amplifier 78. Thus, according to the present invention, some of the gain of the RF amplifier is sacrificed to maintain the supply voltage to the parameter sensing portion 56 of the circuit 14 at least at the predetermined minimum value that insures operation of the controller 66.

FIG. 3 schematically illustrates a circuit 14a constructed in accordance with a second exemplary embodiment of the present invention. For purposes of description, the circuit 14a is associated with tire-based unit 26 of the tire parameter sensing system 12 of FIG. 1. Tire-based units 28, 30, and 32 may include similar circuits. Structures of the circuit 14a of FIG. 3 that are the same or similar to the structures described above with reference to FIG. 2 are labeled using the same reference numbers with the addition of the suffix "a" and are not described in detail with reference to FIG. 3.

To prevent the voltage supplied to the parameter sensing portion 56a of the circuit 14a from falling below the predetermined minimum value when the equivalent series resistance 64a of the battery 60a increases, the circuit 14a is provided with a resistance varying device 90a. The resistance varying device 90a is located in the electrical path 86a for biasing the RF amplifier 78a. The resistance varying device 90a includes resistors 94 and 96 that are wired in parallel to one another. Resistor 96 is permanently coupled to the electrical path 86a. A switch 98 couples resistor 94 to the electrical path 86a. The switch 98 of FIG. 3 is a normally closed switch. When the switch 98 is closed, resistor 94 is operatively coupled to electrical path 86a so that the resistors 94 and 96 are in parallel. The switch 98 is controllably coupled to the controller 66a and the controller 66a controls the opening and closing of the switch 98 in a manner so as to maintain a supply voltage of at least the predetermined minimum value to the parameter sensing portion 56a.

The controller 66a is responsive to at least one of the voltage signals provided by the voltage sensor 68a and the temperature signals provided by the temperature sensor 70a for controlling the switch 98 of the resistance varying device 90a. In an exemplary embodiment, the controller 66a is responsive to both voltage and temperature. The controller 66a uses the sensed voltage and sensed temperature to determine whether the equivalent series resistance 64a of the battery 60a is increasing. When the controller 66a determines that the equivalent series resistance 64a is increasing to a level in which the supply voltage to the parameter sensing portion 56a of the circuit 14a is nearing the predetermined minimum value, the controller 66a opens the switch 98 to decouple resistor 94 from the electrical path 86a and thereby increase the resistance of the resistance varying device 90a. By increasing the resistance of the resistance varying device 90a, the current drawn from the power supply portion 62a of the battery 60a decreases. As a result, the voltage drop associated with the equivalent series resistance 64a decreases and the voltage supplied to the parameter sensing portion 56a is maintained at least at the predetermined minimum value to insure operation of the controller 66a.

FIG. 4 illustrates an alternative construction of the resistance varying device 90a of FIG. 3. As illustrated in FIG. 4, the resistance varying device 90a' of FIG. 4 includes a resistor 100 and a short 102 that is wired in parallel with the resistor 100. The short 102 is a bypass having minimal resistance as compared to resistor 100.

A switch 104 couples the short 102 to the electrical path 86a. The switch 104 is a normally closed switch. When the switch 104 is closed, the short 102 is controllably coupled to electrical path 86a. The switch 104 is operatively coupled to the controller 66a and the controller 66a controls the opening and closing of the switch 104 in a manner so as to maintain a supply voltage of at least the predetermined minimum value to the parameter sensing portion 56a. When the controller 66a determines that the equivalent series resistance 64a is increasing to a level in which the supply voltage to the parameter sensing 56a is nearing the predetermined minimum value, the controller 66a opens the switch 104 to remove the short 102 and increase the resistance of the resistance varying device 90a'.

FIG. 5 schematically illustrates a circuit 14b constructed in accordance with a third exemplary embodiment of the present invention. For purposes of description, the circuit 14b is associated with tire-based unit 26 of the tire parameter sensing system 12 of FIG. 1. Tire-based units 28, 30, and 32 may include similar circuits. Structures of the circuit 14b of FIG. 5 that are the same or similar to the structures described above with reference to FIG. 2 will be labeled using the same reference numbers with the addition of the suffix "b" and are not described in detail with reference to FIG. 5.

To prevent the voltage supplied to the parameter sensing portion 56b of the circuit 14b from falling below the predetermined minimum value when the equivalent series resistance 64b of the battery 60b increases, the circuit 14b is provided with resistance varying device 90b. The resistance varying device 90b is located in the electrical path 86b for biasing the RF amplifier 78b. The resistance varying device 90b of FIG. 5 includes a thermistor 106 having a resistance that increases as temperature decreases. The thermistor 106 operates independently of the controller 66b.

In the circuit 14b of FIG. 5, the resistance of the thermistor 106 increases as the equivalent series resistance 64b of the battery 60b increases. The increased resistance in the circuit 14b decreases the current drawn from the power supply portion 62a of the battery 60a. As a result, with appropriately selected components, the voltage drop associated with the equivalent series resistance 64b does not increase as the resistance of the equivalent series resistance increases and a voltage of at least the predetermined minimum value is supplied to the parameter sensing portion 56b of the circuit 14b.

Figure 6:
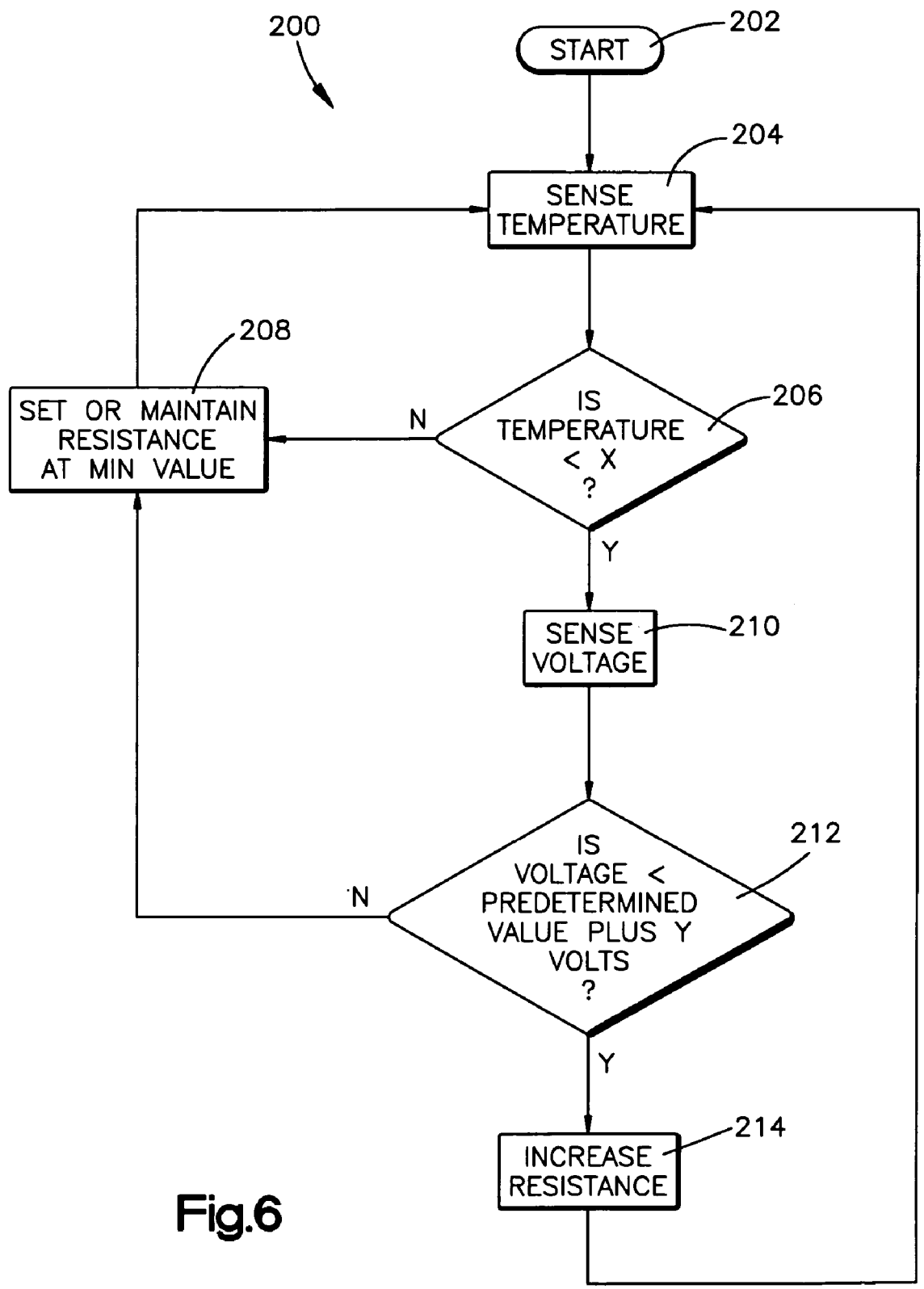
FIG. 6 is a flow diagram illustrating an exemplary process according to the present invention.

FIG. 6 is a flow diagram illustrating an exemplary process 200 according to the present invention. The process 200 begins at step 202. At step 204, the temperature is sensed. At step 206, a determination is made as to whether the sensed temperature is less than a predetermined temperature, indicated as X. The predetermined temperature X is a temperature at which the equivalent series resistance of the battery may begin to increase to a level sufficient to lower the voltage supplied to the parameter sensing portion of the circuit near the predetermined minimum value. If the determination at step 206 is negative (indicating that the sensed temperature is not less than X), the process 200 proceeds to step 208. At step 208, the resistance of the resistance varying device is set to the minimum resistance. If, prior to step 208, the resistance of the resistance varying device is already at the minimum resistance, then the resistance is maintained at the minimum resistance at step 208.

If the determination at step 206 is affirmative (indicating that the sensed temperature is less than X), then the process 200 proceeds to step 210. At step 210, the voltage supplied to the parameter portion of the circuit is sensed. The process 200 proceeds from step 210 to step 212.

At step 212, a determination is made as to whether the sensed voltage is less than the predetermined minimum value plus a predefined amount, indicated as Y. For example, assuming the predetermined minimum value is 2.0 volts, the predefined amount Y may be 0.10 volts. Thus, in the example, a determination is made at step 212 as to whether the sensed voltage is less than 2.10 volts. If the determination at step, 212 is negative, then the process 200 proceeds to step 208. At step 208, the resistance of the resistance varying device is set to or maintained at the minimum resistance.

If the determination at step 214 is affirmative, the process 200 proceeds to step 214. At step 214, the resistance of the resistance varying device is increased. From step 214, the process 200 returns to step 204 and is repeated.

From the above description of the invention, those skilled in the art will perceive improvements, changes and modifications. For example, the resistance varying device 90*a* of the circuit 14*a* of FIG. 3 may include more than two resistors and more than one actuatable switch to enable the resistance to be increased in steps. Also, combination of the various embodiments may be used. For example, the resistor 100 of FIG. 4 may be a variable resistor having a resistance that is controlled by the controller 66*a*. Such improvements, changes and modifications within the skill of the art are intended to be covered by the appended claims.

Having described the invention, I claim the following:

1. A circuit for controlling voltage in a tire-based unit of a tire parameter sensing system, the circuit comprising:
   a battery for supplying electrical energy, the battery having an equivalent series resistance that varies inversely with temperature; and
   a current control device that is responsive to at least one of an output voltage of the battery and temperature for adjusting a current draw from the battery to insure a predetermined minimum output voltage from the battery.

2. The circuit of claim 1 further including a sensor portion that is operative to sense a parameter of the tire when supplied with a voltage of at least the predetermined minimum value and signal transmission circuitry for transmitting a signal indicative of the sensed parameter, the sensor portion and the signal transmission circuitry receiving electrical energy from the battery and being wired in parallel to one another, the signal transmission circuitry being wired in series with the current control device.

3. The circuit of claim 2 wherein the signal transmission circuitry includes an amplifier, the current control device controlling the current supplied to the amplifier.

4. The circuit of claim 3 wherein the current control device varies a resistance in an electrical path for biasing the amplifier.

5. A circuit for use in a tire of a vehicle having a tire parameter sensing system, the circuit comprising:
   a battery for supplying electrical energy, the battery having an equivalent series resistance that varies inversely with temperature;
   a sensor portion that is operative to sense a parameter of the tire when supplied with a voltage of at least a predetermined minimum value; and
   a resistance varying device being responsive to at least one of a supplied voltage and a temperature for reducing a current draw from the battery so as to reduce a voltage drop resulting from the equivalent series resistance of the battery and maintain at least the predetermined minimum value of voltage to the sensor portion.

6. The circuit of claim 5 wherein the sensor portion includes a controller, the controller being operatively coupled to the resistance varying device and controlling the resistance varying device in response to at least one of the supplied voltage and the temperature.

7. The circuit of claim 6 wherein the resistance varying device includes a controllable variable resistor.

8. The circuit of claim 6 wherein the resistance varying device includes first and second resistors connected in parallel to one another and a switch that is operable for disconnecting one of the first and second resistors so as to increase a resistance of the resistance varying device, the controller controlling operation of the switch.

9. The circuit of claim 6 wherein the resistance varying device includes a first electrical path which forms a short, a second electrical path that includes a resistor, and a switch being operable to disconnect the short so as to increase a resistance of the resistance varying device, the controller controlling operation of the switch.

10. The circuit of claim 6 further including a voltage sensor for sensing the supplied voltage to the controller and a temperature sensor for sensing the temperature, the controller being responsive to the sensed voltage and sensed temperature for determining whether the equivalent series resistance of the battery is increasing, the controller, in response to determining that the equivalent series resistance is increasing, controlling the resistance varying device to increase resistance so as to reduce the current draw from the battery.

11. The circuit of claim 5 wherein the resistance varying device is a thermistor that has a resistance that varies inversely with temperature.

12. The circuit of claim 5 further including signal transmission circuitry having an amplifier, the battery supplying a control voltage and a bias voltage to the amplifier, the resistance varying device being located in an electrical path for supplying bias voltage to the amplifier.

13. A method of controlling voltage in a tire-based unit of a tire parameter sensing system having a battery, the method comprising the steps of:
   determining whether an equivalent series resistance of the battery is increasing; and
   reducing a current draw from the battery, in response to determining an increase in the equivalent series resistance, so as to reduce a voltage drop resulting from the equivalent series resistance of the battery and maintain an output voltage from the battery of at least a predetermined minimum value.

14. The method of claim 13 wherein the step of reducing a current draw from the battery includes the step of increasing resistance in series with the battery.

15. The method of claim 14 wherein the step of determining whether an equivalent series resistance of the battery is increasing further including the steps of:
  sensing a temperature near the battery;
  sensing the output voltage of the battery; and
  determining whether sensed temperature and the sensed output voltage indicate an increase in the equivalent series resistance of the battery.

* * * * *